United States Patent Office 3,338,536
Patented Aug. 29, 1967

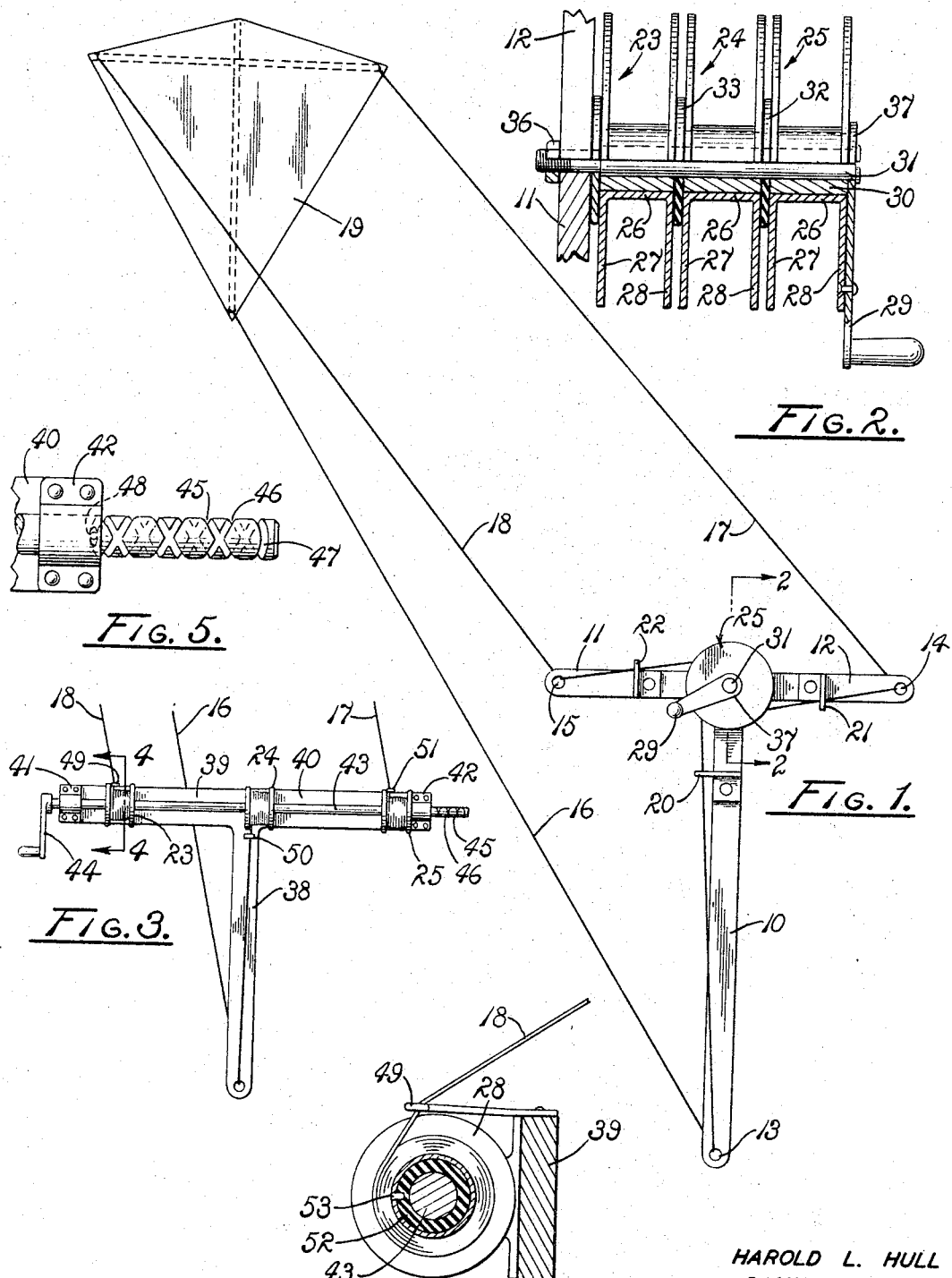

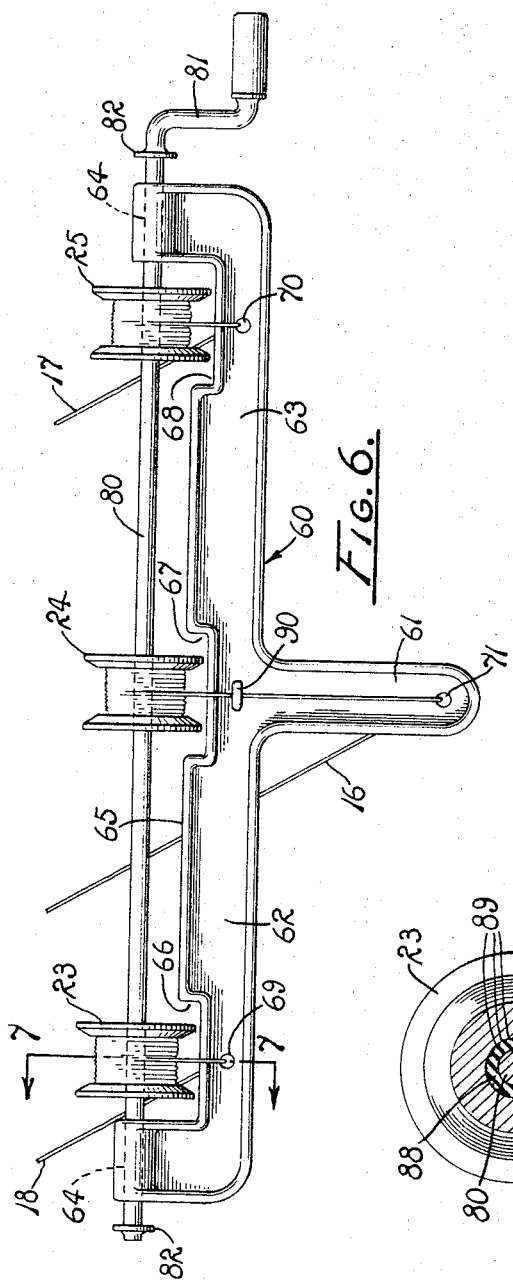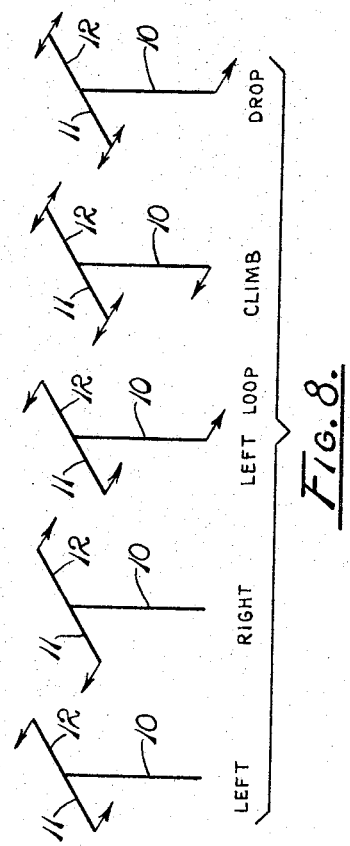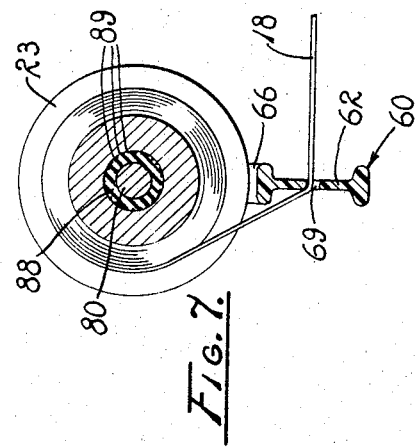

3,338,536
REMOTE CONTROL DEVICES
Harold L. Hull and Danny M. Hull, both of
11088 Kay Lane, Hanford, Calif. 93230
Filed Nov. 19, 1963, Ser. No. 324,660
7 Claims. (Cl. 244—155)

The instant application constitutes a continuation-in-part of our copending application Ser. No. 217,360, filed August 16, 1962, now abandoned, entitled "Controls for Airborne Devices."

The present invention relates to remote control devices and more particularly to such devices for objects subjected to reaction forces and which are positionable by the application of regulated opposing forces. Such reaction forces may be gravitational, magnetic, buoyant, incident to fluid movement, liquid or gaseous, relative to the objects to be controlled, or of other cause. However, the invention was developed in the solution of certain problems encountered in remotely controlling air-borne devices and is appropriately illustrated in connection with such utilization.

The broad essence of the invention resides in the provision of a control member having a plurality of spaced line guides, control lines individual to the guides engaged with their respective guides, reels individual to the guides having the lines of their respective guides wound thereon with said lines providing ends opposite to the guides from the reels for connection to an object to be controlled, and means mounting the reels on the control member in coaxial relation for manually selectively rotating the reels for relative adjustment of the effective lengths of the lines and simultaneously rotating the reels for corresponding adjustment of the effective lengths of the lines, the control member being manipulatable relatively to move the guides toward and from the object to be controlled selectively to simulate adjustment of the relative effective lengths of the lines and simultaneously toward and from the object to simulate corresponding adjustment of the effective lengths of the lines.

Such structure provides a control device by which a kite or the like can be caused to perform many maneuvers, lateral travel in either direction, loops, Immelmann turns, figure eights, climbs, dives, drops, and the like, making the control ideal for target practice in aerial operations, making it possible to utilize kites in competitive maneuvers and exhibitions, and facilitating use of kites for advertising and other uses.

With some types of devices only two flexible lines are required, while for kites, of any desired form, including the two-stick and three-stick frames, three flexible lines are adequate for control of universal movements. Three lines have the obvious advantage of establishing three-point control through three-point determination of plane of position.

This invention also embodies traversing means for causing the lines to wind uniformly on the spools, with the spools individually adjustable for increasing or decreasing the relative length of payout line for any of the connections, for providing the most accurate control.

The objects and advantages of the invention are as follows:

First, to provide control means for airborne devices and the like which achieve the maximum in accuracy of flight direction and maneuvers.

Second, to provide control means as outlined in which control is provided and maintained through a unitary hand-held element.

Third, to provide control means as outlined in which a plurality of flexible lines are used and operated between the airborne device and the hand-held element.

Fourth, to provide control means as outlined in which the several flexible lines are individually adjusatble at will for most efficient control of the airborne device.

Fifth, to provide control means as outlined in which traversing means is provided for uniform winding and unwinding of the flexible lines.

Sixth, to provide a reel for each line with the reels frictionally driven and individually adjustable through manual rotation against the frictional resistance while the other reels are held against rotation.

Seventh, to provide a control device of the character described utilizing reels which are selectively independently and concurrently rotatable correspondingly selectively and concurrently to regulate the effective lengths of associated control lines in combination with a control member on which the reels are mounted having line guide means and which can be tilted or moved for more rapid simulation of selective and concurrent regulation of effective control line lengths than normally attainable by reel rotation but of more restricted magnitude.

Further objects and advantages will become apparent in the subsequent description in the specification.

In describing the invention, reference is made to the accompanying drawings, in which:

FIG. 1 is a rear elevation of a device of the invention as connected to a kite, and in which spools or reels are frictionally connected and mounted at the junction of the vertical and horizontal control arms.

FIG. 2 is an enlarged half-section taken on line 2—2 of FIG. 1.

FIG. 3 is a rear elevation of a second form of the invention in which the reels are spaced apart and provided with traversing means for uniform winding and unwinding of the lines.

FIG. 4 is a somewhat enlarged transverse section of the device of FIG. 3 taken on line 4—4 showing the frictional mounting of the take-up reels and showing one of the line guides.

FIG. 5 is an enlarged fragmentary view of the device of FIG. 3 showing a traversing means for the reels.

FIG. 6 is a rear elevation of a third form of the invention.

FIG. 7 is a section taken on line 7—7 of FIG. 6.

FIG. 8 diagrammatically illustrates the manual operations of the control device for producing a few of the possible maneuvers.

The first form of the invention includes a vertical arm 10 and two opposed lateral arms or cross arm, 11 and 12, constituting a control member, the arms being provided with guides, such as the bores or passages 13, 14 and 15 for the respective lines 16, 17 and 18 which are respectively connected to the tail end and side arms of a kite 19, though for a glider and some other types of objects to be controlled, two lines prove to be sufficient.

The arms 10, 11 and 12 are provided with bracket guides 20, 21 and 22 to direct the lines 16, 17 and 18 respectively as taken up or paid out.

Takeup and payout reels 23, 24 and 25 each consist of a cylindrical hub 26 with a disc at each end, as indicated at 27 and 28, the outer reel 25 having a crank handle 29 fixed thereon.

The hubs 26 of the reels 23, 24 and 25 are rotatable on respective bushings 30 which are mounted on a shaft 31. Friction discs 32 and 33 are interposed axially between the reels and bushings, the shaft being removably secured in the cross and vertical arm junction area, as indicated at 36, the bushings 30 and a hub portion 37 of the crank handle compressing the inner portions of the friction discs to maintain them in position, with the reels frictionally cooperative with the outer portions of the friction discs. With this arrangement, the reels may be frictionally driven as a unit by the crank handle 29 or independently turned by manually grasping a reel and exerting a turning moment sufficient to overcome the friction of the discs.

The second form of the invention shown in FIG. 3 is quite similar to the first form, having a vertical arm 38, and the lateral arms 39 and 40 constituting a control member. However, instead of the reels 23, 24 and 25 being grouped together, as shown in FIG. 2, they are spaced almost throughout the length of the lateral arms, these arms having a bearing at each end, as indicated at 41 and 42, in which a shaft 43 is rotatable and provided with a crank handle 44 at one end.

The traversing means is provided consisting of right and left hand threads cut in an end of the shaft 43, as indicated at 45 and 46, and terminating in a return connection 47 at each end. The bearing 42 has a rider 48 in the form of an inwardly extended pin rotatably mounted in the bearing and inwardly extended therefrom. The inner end of the pin has an elongated substantially elliptical shoe which travels back and forth in the respective threads to cause the shaft to move axially back and forth as the shaft is rotated, thus providing for even payout and takeup of the lines on the spools. Each spool is preferably provided with a bracket guide, as indicated at 49, 50 and 51, through which the lines are threaded.

The reels 23, 24 and 25 of the second form are frictionally driven by the shaft 43 through friction bushings 52 which may be fixed to the hubs of their reels by pins 53, or if preferred, may be frictionally engaged with both the hubs and the shaft, or affixed to the shaft and frictionally engaged with the hubs.

As shown in FIG. 6, the third form of the invention employs a control member 60, of plastic or other suitable material, having a depending arm 61 and oppositely laterally extended, aligned arms 62 and 63. Opposite ends of the control member are upwardly extended and provide aligned bearings 64. The arms 62 and 63 provide a recessed edge 65 which is notched at 66 in alignment with the arm 61 and adjacent to the bearings 64 at 67 and 68. The arms 62 and 63 have bores 69 and 70 extended therethrough adjacent to the notches 67 and 68 and centrally thereof. A bore 71 is extended through the depending end of the arm 61. As before, the bores serve as guides for control lines 16, 17 and 18 which are threaded through them.

A shaft 80 is journaled in the bearings 64 and provides a crank handle 81 at one end. A pair of washers 82 are secured to the shaft outwardly adjacent to the bearings and spaced therefrom so that the shaft may be reciprocated axially with the washers serving as stops. Reels 23, 24 and 25 are frictionally mounted on the shaft and extend into the notches 66, 67, and 68, respectively, the opposite ends of which serve as limit stops for the reels upon axial movement of the shaft 80. The frictional mounting of the reels on the shaft is conveniently accomplished, as shown in FIG. 7, by positioning rubber sleeves 88 on the shaft which have longitudinally extended ribs 89 and over which the hubs of the reels are tightly fitted.

The lines 16, 17, and 18 extend through their respective guides bores 71, 70 and 69 and to their respective reels 84, 85 and 83, to which they are secured. A guide bale 90 is preferably formed in the control member adjacent to the reel 24 and receives the line 16 therethrough.

Operation

The operation of the described embodiments of the subject invention is believed to be readily apparent and is briefly reviewed at this point. By means of the crank handles 29, 44 and 81 their respective shafts 31, 43 and 80 are rotated correspondingly to rotate the reels 23, 24 and 25 mounted thereon to reel in or pay out the lines connected thereto. Such action draws the kite 19, or other control object, toward the operator or permits the kite to move farther from the operator while maintaining the same attitude.

As illustrated in FIG. 8, to cause the kite to move to the left, the right arm 12 is advanced and the left arm 11 retracted while the depending arm 10 remains vertical. To turn to the right, the left arm is advanced and the right arm retracted. To perform a left loop the right arm is advanced, the left arm retracted, and the depending arm retracted. To climb, the depending arm is advanced and the lateral arms may be oppositely advanced or retracted to impart a turning moment to the kite. To cause the kite to drop, the depending arm is retracted and the lateral arms may be oppositely advanced or retracted to impart a turning moment to the kite. The arms 38, 39, and 40 of the second form and 61, 62 and 63 of the third form are similarly manipulated to achieve corresponding results. During such operations, the reels mounted on the shafts may be held in fixed position and very rapid and deft control of the kite or other object effected.

Alternatively, the effective lengths of the lines 16, 17, and 18 can be regulated by independent rotation of their respective reels. This is done by grasping the reels and rotating them relative to each other by overcoming the friction of their mountings on their shafts. The effective lengths of the lines can be conjunctively regulated by rotation of the shafts which results in corresponding rotation of the reels through their friction mountings. It will be obvious that tipping or shifting the planes of the control members achieves precise minute control while the rotation of the reels on the shaft, or with the shaft, achieves greater range of variation in effective line length although usually with somewhat less precision of variation. The lines are reeled in or paid out to raise or lower the kite by manipulating the cranks. The full advantages of the remote control devices of the present invention are realized by those who develop sufficient skill selectively to use corresponding reel rotation and independent reel rotation in conjunction with tipping and tilting movements of the control members.

As will be understood, the lines 16, 17 and 18 are frictionally engaged with their respective guides. The reels are frictionally mounted on their shafts or frictionally interconnected. In each instance the reels are frictionally driven as a unit or independently rotatable by overcoming such friction. The frictional resistance of the reels to independent rotation on their respective shafts incident to line tensioning is greater than the frictional engagement of the lines with the guides. Thus, crank handle rotation at all times is adequate to draw the lines through the guides. During usual operations, the combined guide and reel mounting friction is adequate to resist line tensioning by the kite so that by holding the crank handles in position, universal kite control can be exercised by movement of the control member.

The axial shifting of the shaft 43 by engagement of the rider 48 in the threads 45 and 46 evenly distributes the lines on their respective reels. The same result is achieved in the third form of the invention by manually shifting the shaft 80 within the limits permitted by the washers 82 while the crank handle 81 is rotated.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described our invention, what we claim as new and desire to secure by Letters Patent is:

1. A control device comprising a control member having a plurality of spaced line guides, control lines individually engaged with the guides, reels individual to the guides having the lines of their respective guides wound thereon with said lines providing ends opposite to the guides from the reels for connection to an object to be controlled, means mounting the reels on the control member in coaxial relation for manually selectively rotating the reels for relative adjustment of the effective lengths of the lines and simultaneously rotating the reels for corresponding adjustment of the effective lengths of the lines, the control member being manipulable relatively to move the guides toward and from the object to be controlled selectively to simulate adjustment of the relative effective lengths of the lines and simultaneously toward and from the object to simulate corresponding adjustment of the effective lengths of the lines, and traversing means borne by the control member for substantially uniformly distributing the lines on their respective reels during reel rotation.

2. A control device for universally orientating an associated objecting comprising three guides, means interconnecting the guides in fixed relation equally spaced from a predetermined central point, reels individual to the guides, control lines individually connected to the reels and extended through their reels' respective guides, means mounting the reels on the guide interconnecting means in coaxial relation for manually selectively rotating the reels for relative adjustment of the effective lengths of the lines and simultaneously rotating the reels for corresponding adjustment of the effective lengths of the lines, the guide interconnecting means being manipulable universally to tip the plane of the guides to simulate adjustment of the relative effective lengths of the lines and to move said interconnecting means toward and from the object to simulate corresponding adjustment of the effective lengths of the lines, and traversing means borne by the interconnecting means for substantially uniformly distributing the lines on their respective reels during reel rotation.

3. A device for universally orientating the plane of a kite or the like for control purposes comprising three guides, a control member interconnecting the guides in fixed relation equally spaced from a predetermined central point, a shaft rotatably mounted on the control member, reels individual to the guides mounted on the shaft in frictional engagement therewith, control lines individually connected to the reels and extended through their reels' respective guides having extended ends for connection to the kite at three points in fixed relation equally spaced from a predetermined central point for corresponding adjustment of the effective lengths of the lines by rotation of the shaft, relative adjustment of the effective lengths of the lines by selective rotation of the reels on the shaft, and said control member being manually manipulable universally to tip the plane defined by the three guides to impart corresponding tipping of the plane defined by the points of connection of the extended ends of the lines to the kite, and means for axially shifting the shaft on the control member during rotation thereof for corresponding axial positioning of the reels substantially uniformly to distribute the lines on their respective reels.

4. A control device comprising a control member having a depending arm and opposed substantially aligned laterally extended arms, the arms providing line guide means adjacent to their outer ends; reels individual to the guide means; a shaft rotatably mounted on said aligned arms having the reels frictionally mounted thereon in axial alignment for manual selective rotation of the reels and simultaneous rotation of the reels by rotation of the shaft; control lines individual to the reels connected to their respective reels, extended through their reels' respective guide means, and having extended ends for connection to an object to be controlled; and means borne by the control member for axially reciprocating the shaft and reels during rotation for substantially uniformly distributing the lines on the respective reels during winding operations.

5. A control device comprising a control member having a plurality of spaced line guides, control lines engaged with the guides, reels individual to the guides having the lines of their respective guides wound thereon with said lines providing ends opposite to the guides from the reels for connection to an object to be controlled, and means for manually selectively or simultaneously operating said reels for equalizing the lengths of the respective lines for uniformity in payout and for simultaneous and equal payout of the lines for increasing the distance between the kite or the like and the control member and for reeling the kite into the control member, said means for manually simultaneously operating said reels including traversing means for advancing and retracting said reels axially relative to the guides for uniform distribution of the lines on the reels.

6. Control means for a kite or the like having lateral and tail end points of attachment, comprising a control member having a depending arm and opposed lateral arms each having a guide for a flexible line, a plurality of reels each having a line with the lines passing through the respective guides and connected to the respective points of attachment on the kite or the like, and means for manually selectively or simultaneously operating said reels for equalizing the lengths of the respective lines for uniformity in payout and for simultaneous and equal payout of the lines for increasing the distance between the kite or the like and the control member and for reeling the kite into the control member, said means for manually simultaneously operating said reels including traversing means for advancing and retracting said reels axially relative to the guides for uniform distribution of the lines on the reels.

7. A control member for a kite or the like having lateral and bottom points of attachment comprising a depending arm having a cross arm at the top, a bearing at each end of the cross arm, and guiding means at the lower end of said depending arm, a shaft rotatable in said bearings, three spaced reels mounted on said shaft and frictionally secured thereon, means for manually rotating said shaft for simultaneous rotation of said three spaced reels, with the reels selectively manually rotatable on the shaft, a guide for each reel, and a flexible line on each reel, said lines having terminal ends passing through their respective associated guides and being attached to the respective points of attachment on the kite or the like, said shaft and one of said bearings include traversing means for axial movement of the shaft and reels in respective directions for uniform distribution of the lines on the reels when the means for manually rotating is operated, with the respective guides for the reels being mounted on the arms.

References Cited

UNITED STATES PATENTS 3,086,739   4/1963   Barber _____ 244—155

MILTON BUCHLER, *Primary Examiner.*

FERGUS S. MIDDLETON, *Examiner.*

A. E. CORRIGAN, *Assistant Examiner.*